July 30, 1935. H. J. WOOCK 2,009,643
MACHINE FOR APPLYING TREAD RUBBER TO TIRES
Filed June 6, 1932 10 Sheets-Sheet 4

INVENTOR
*H. J. Woock*
BY
ATTORNEY

July 30, 1935. H. J. WOOCK 2,009,643
MACHINE FOR APPLYING TREAD RUBBER TO TIRES
Filed June 6, 1932 10 Sheets-Sheet 5

INVENTOR
*H. J. Woock*
BY
ATTORNEY

July 30, 1935. H. J. WOOCK 2,009,643
MACHINE FOR APPLYING TREAD RUBBER TO TIRES
Filed June 6, 1932 10 Sheets-Sheet 9

INVENTOR
H. J. Woock
BY
ATTORNEY

Patented July 30, 1935

2,009,643

UNITED STATES PATENT OFFICE 2,009,643

MACHINE FOR APPLYING TREAD RUBBER TO TIRES

Herbert J. Woock, Lodi, Calif., assignor to Super Mold Corporation, Lodi, Calif., a corporation of Nevada Application June 6, 1932, Serial No. 615,641

44 Claims. (Cl. 154—9)

This invention relates to the tire retreading art and has for its main object the provision of a practical machine for applying bulk retread rubber to the tire in the form of a number of continuous layers or wrappings so as to build up the desired tread base on the tire casing corresponding to that had with the use of camelback and eliminating the need of the same.

The disadvantages of the camelback have been fully recited in the co-pending application of myself and W. B. Thurman, Serial No. 542,994, filed June 8, 1931, over the apparatus of which application the machine of the present invention is a vast improvement, as will be obvious.

Apart from merely applying the rubber to the tire it is necessary that the tire be held against the rubber with considerable pressure in order to obtain the necessary adhesion of the rubber with the tire; and in order to flatten the tread portion of the usual round tire so that the flat strips of rubber from the mill may be applied evenly and with substantially equal pressure to the tread portion for the desired width. To hold the tire in contact with the rubber coming from the mill with the necessary predetermined pressure and to maintain such pressure substantially constant as the diameter of the tire increases with the superimposed wrappings of the rubber thereon, forms another object of the present invention.

It is also a further object to provide for the automatic cutting down of the width of the rubber strips as they are applied to the tire in superimposed relation to each other, so that the cross sectional form of the rubber when completely applied will approximate that of the finished tread.

Still another object of this invention is to arrange the machine so that the cushion rubber—a layer of which is applied to the bare tire casing before the tread rubber is applied—may be handled in the mill of the machine, confined within predetermined limits, and applied to the tire, while the tread rubber to be subsequently applied is being rolled in the mill to give it the necessary thorough mixing and to bring it in proper condition for application. No unnecessary time is therefore lost between the application of the cushion wrapping to the tire and the subsequent application of the tread rubber.

Still another object is to provide a machine for the purpose so constructed that it may be successfully used without change in connection with tires of any circumferential or cross sectional size. As a result of the incorporation of the above and other features in this machine, as will be hereinafter seen, the rubber may be applied to the tire and the latter ready for placing in the vulcanizing mold in from ten to fifteen minutes from the time the tire is first mounted in place on the machine ready for the initial cushion strip of rubber to be applied.

These objects I accomplish by means of such structure and relative arrangement of parts as will fully appear by a perusal of the following specification and claims.

In the drawings similar characters of reference indicate corresponding parts in the several views.

Figure 1:
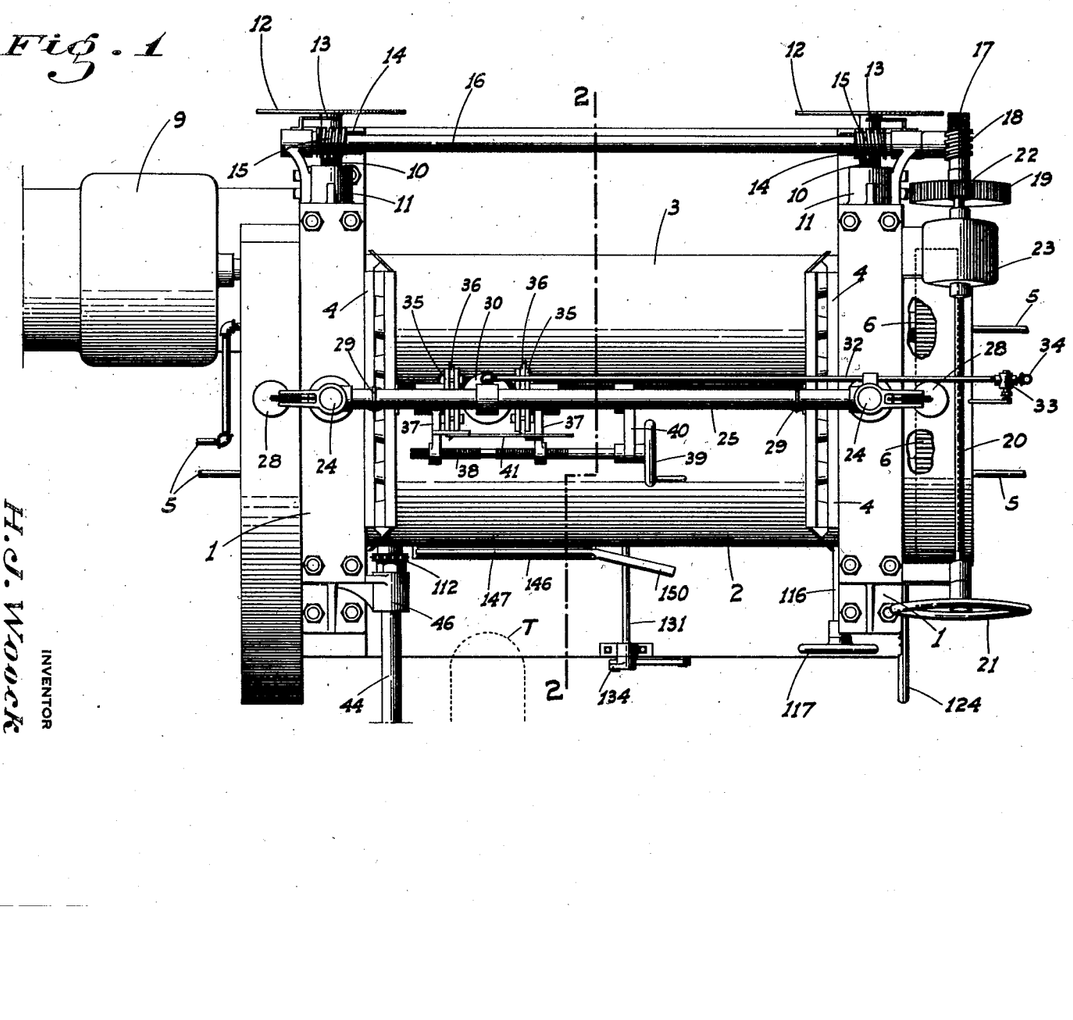
Fig. 1 is a top plan view of the mill portion of the machine.
Figure 2:
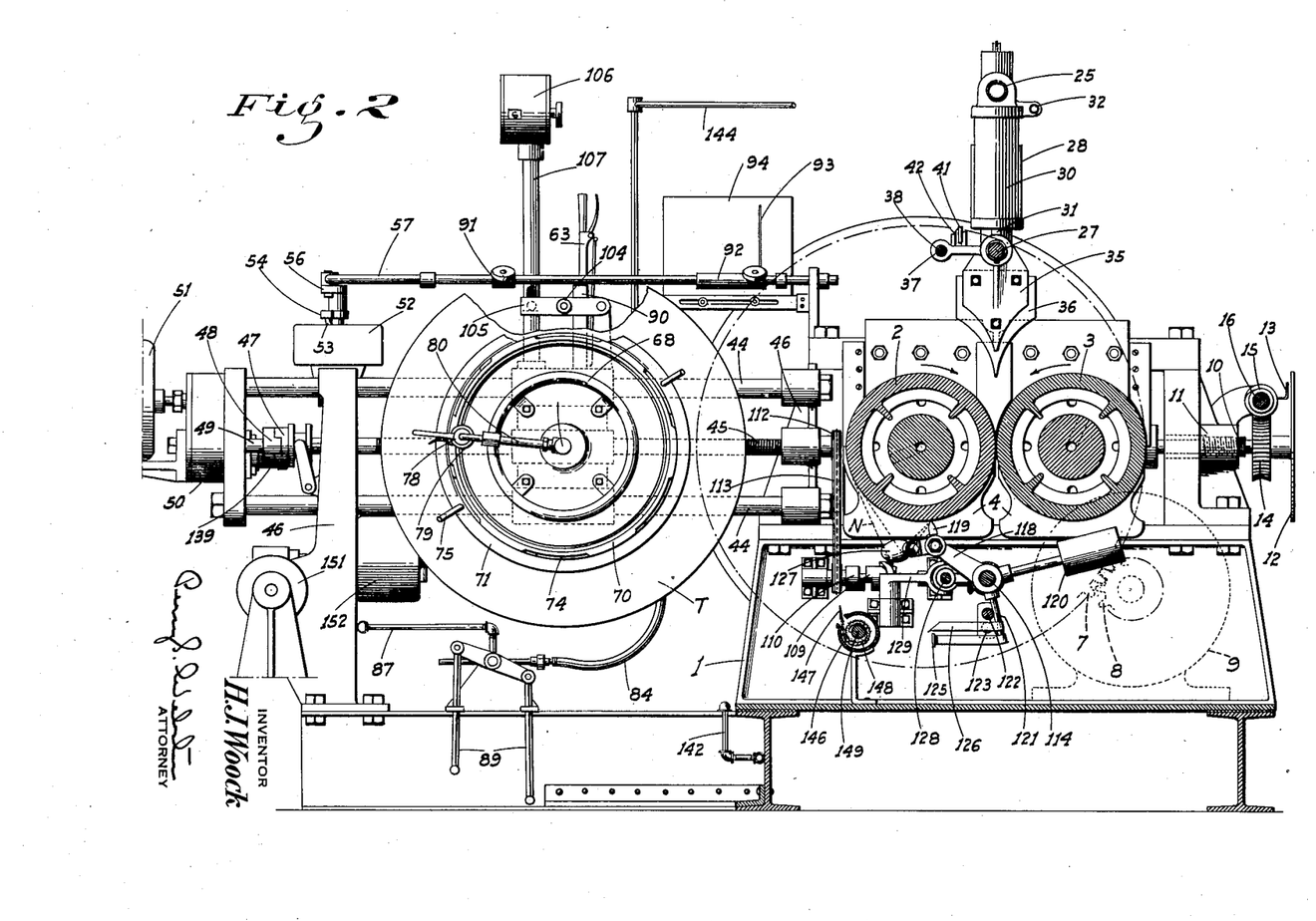
Fig. 2 is a side view of the machine with a tire to be retreaded being advanced toward the mill, the latter being in section, as on the line 2—2 of Fig. 1.

Referring now more particularly to the characters of reference on the drawings, the numeral 1 denotes the vertical side frames of the mill between which are disposed the horizontal front and rear rolls 2 and 3 mounted in bearing blocks 4 supported by the frame. The rolls are hollow and are heated by steam circulated through pipes 5 connected to the rolls in a suitable manner. The rolls are connected in driving relation on one end by gears 6 and one roll on the other end has a driving gear 7 meshing with a pinion 8 directly connected to an electric motor 9; the direction of rotation of the motor being such that the upper surfaces of the rolls turn toward each other.

The rear roll 3 is adjustable to and from the front roll by screws 10 disposed at right angles to the roll and engaging the corresponding blocks 4 at their back ends. The screws are threaded in boxes 11 secured to the frames 1 and on their outer ends carry dial disks 12. These disks are graduated to indicate the spacing between the rolls and read against fixed pointers 13. Worm gears 14 are fixed in connection with the screws and are engaged by worms 15 mounted on a shaft 16 extending parallel to the rolls. On one end this shaft carries a gear 17 engaged by a worm 18 having a gear 19 connected thereto in axial relation therewith. The worm and gear shaft 20 extends to the front of the mill and has a hand wheel 21 thereon. A pinion 22 driven by an electric motor 23 engages the gear 19. The main or rough adjustment of the roll is made by means of the motor while the completion of the adjustment to the necessary accurate degree, as determined by viewing the relationship of the disks 12 to their pointers, is effected by manipulation of the hand wheel 21.

The rolls are long enough so that the rubber not being actually used at the minute can be rolled while the other rubber is being applied to the tire in the manner set forth later.

Figure 5:
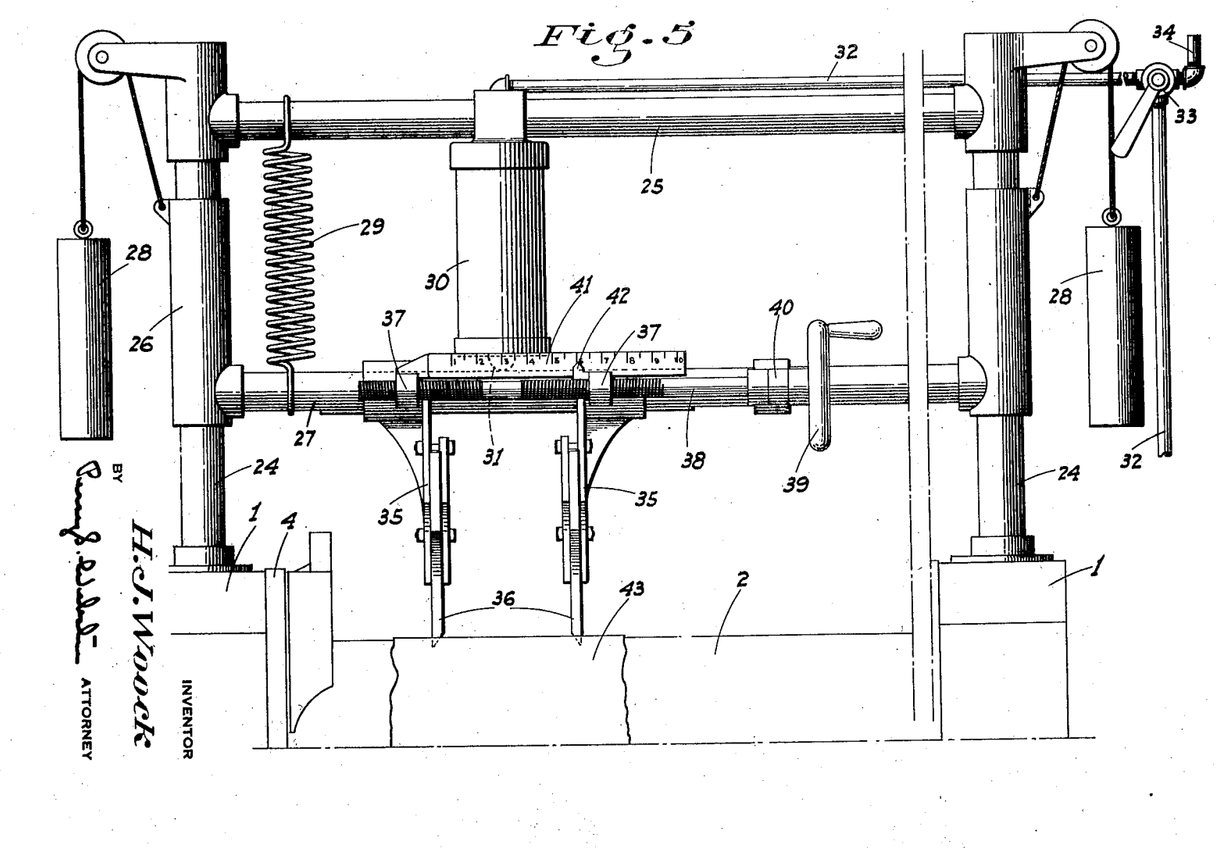
Fig. 5 is a front view of the cushion rubber gauging and trimming mechanism.

Projecting upwardly from the frames 1 in a position centrally between the rolls are posts 24 connected adjacent their upper ends by a cross bar 25. Sleeves 26 are slidable on the posts below the bar, these sleeves being connected by a cross bar 27. The sleeves and bar are normally held raised by end counterweights 28 and also by tension springs 29 extending between the bars. An air cylinder 30 depends from and is supported by the cross bar 25 toward its left hand end, the piston rod 31 depending from the cylinder and engaging the bar 27. A compressed air feed pipe 32 leads to the top of the cylinder with a conveniently positioned three-way hand valve 33 therein, there being an exhaust pipe 34 from the valve to atmosphere.

Brackets 35 depend from and are slidably keyed on the bar 27 in symmetrical relation on opposite sides of the cylinder and have guide and trimming plates 36 secured thereto. The opposite edges of these plates are concavely curved on radii equal to that of the rolls as in Fig. 2 so that when lowered the points of the plates will project deeply between the rolls. Supports 37 project forwardly from the brackets through which are threaded the right and left hand portions of a screw 38. This screw has a hand wheel 39 on one end and is held against longitudinal movement by a support 40 secured to the rod 27. A horizontal graduated scale 41 is secured to one support and projects beyond the other one, a pointer 42 on the other support reading against the scale. By means of this device the separation of the plates 38 to a distance depending on the width of the cushion rubber 43 desired for any particular tire, may be effected by turning the hand wheel; the gauge plates always moving symmetrical relative to the air cylinder; the position of the plates being also symmetrical to the transverse central plane of the tire being worked on.

When the plates have been adjusted the predetermined proper distance as evidenced by the scale, air is admitted to the cylinder, which causes the bar 27 and parts connected thereto to be lowered. The plates 36 will then gauge the width of the cushion rubber to be rolled onto the tire and will trim the edges of the same with the rotation of the rolls so that a strip of definite width will be applied to the tire. When the strip has been thus applied the air is exhausted from the cylinder by suitable manipulation of the valve 33, whereupon the weights and springs will act to suddenly raise the bar 27 to its normal position. The cushion strip gauge and trimming device being mounted near one end of the rolls the rubber for the tread may be rolled between the remaining portion of the rolls without interfering with the application of the cushion strip, so that but little time is lost between said application and that of the tread rubber.

Projecting horizontally from the front left hand frame 1 (or the one on the same side as that adjacent the above described gauge structure) are fixed upper and lower guide bars 44, between which and parallel thereto is a screw shaft 45. The bars and shaft at their opposite ends are supported by suitable standards 46. The shaft 45 at its end opposite the mill has a sliding clutch element 47 keyed thereon normally engaging a similar element 48 fixed on the adjacent end of a shaft 49 which is connected by reduction gearing housed in a casing 50 with a reversible electric motor 51.

Figure 10:
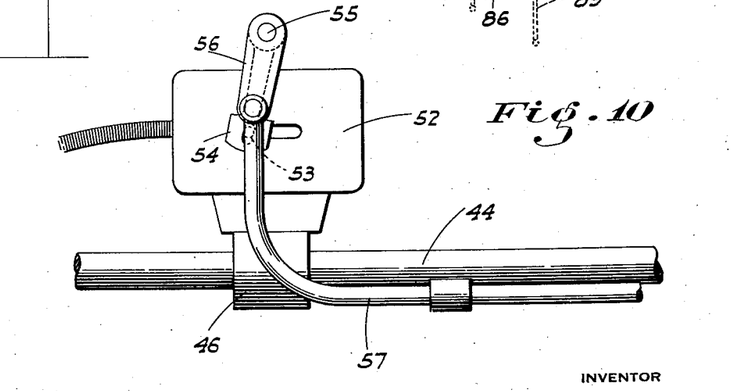
Fig. 10 is a fragmentary top plan view of the switch controlling mechanism for the tire advancing motor.

The circuit to the motor is controlled from a switch box 52 mounted on the standard 46 furthest from the mill and having a throw arm 53 projecting from the top. This arm is engaged by a member 54 projecting radially from a vertical shaft 55 supported in connection with the standard and switch box. An arm 56 projects radially from the upper end of this shaft and is connected to a control rod 57 which extends parallel to and above the upper bar 44 and extends as far as the mill.

The bars 44 slidably support a cross head 58 through which the shaft 45 is threaded, so that with the rotation of said shaft one way or the other the cross head will be moved along the bars in corresponding direction. The switch and the threading of the shaft are arranged so that when the switch arm is thrown away from the mill the motor and shaft are turning so that the cross head will be moved toward the mill, and vice versa.

Figure 6:
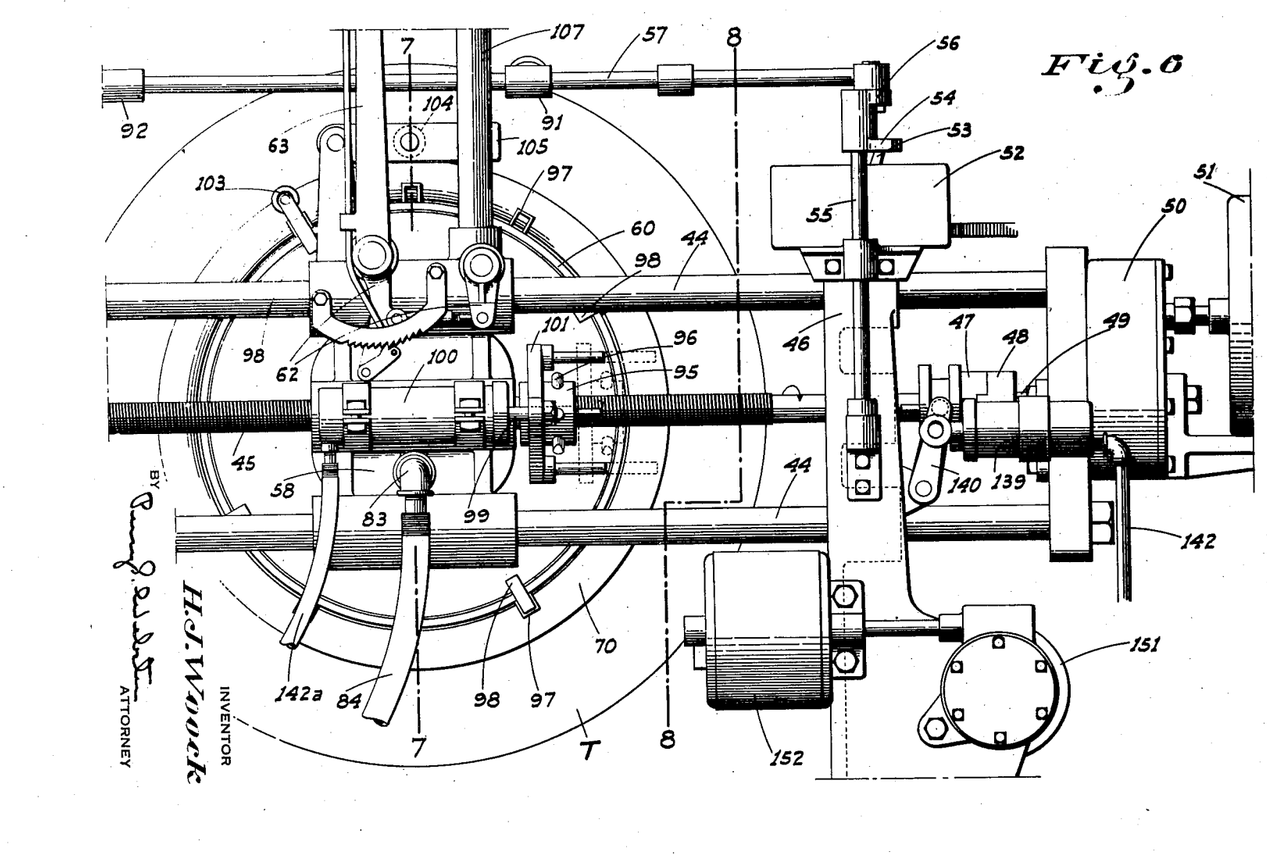
Fig. 6 is a fragmentary back view of the tire supporting and advancing structure.
Figure 7:
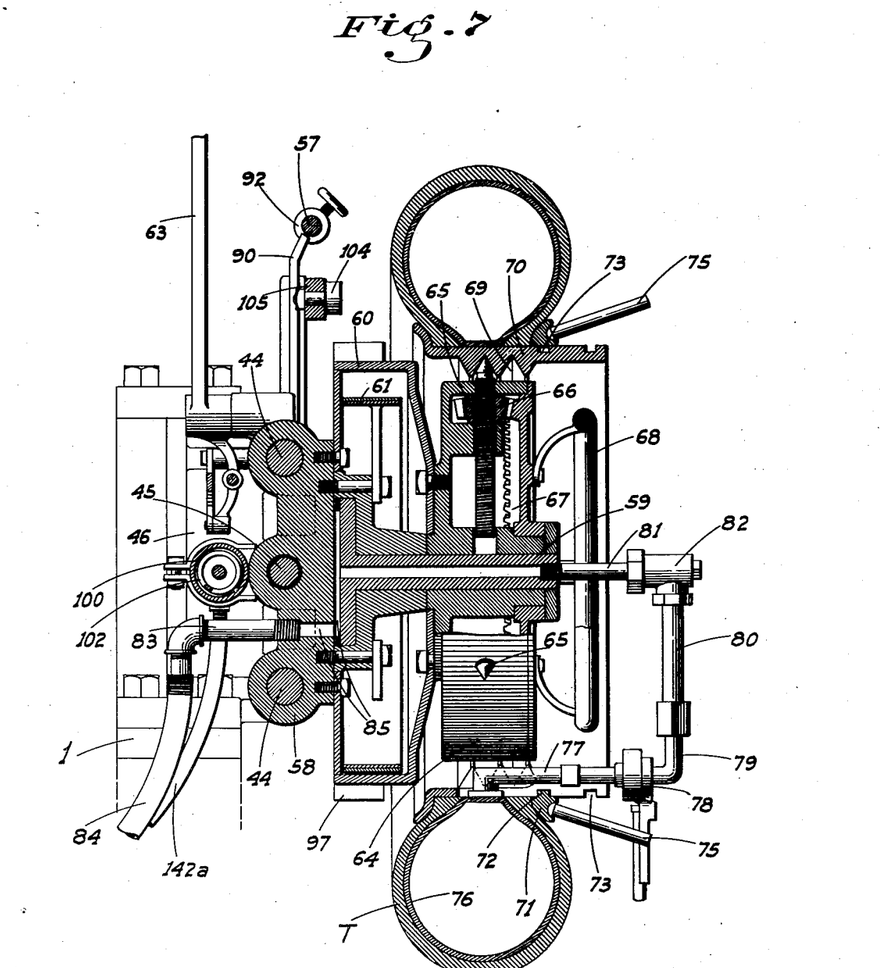
Fig. 7 is a cross section on the line 7—7 of Fig. 6.

The cross head supports a tubular spindle 59 projecting parallel to the rolls and on the same side of the plane of the cross head as said rolls. Turnable on the spindle is a brake drum 60 with which an internal brake band 61 is associated, said band being anchored in connection with the cross head. The operation of the brake is controlled by a suitable mechanism 62 actuated by an upstanding hand lever 63 mounted on the cross head back of the drum. Likewise turnable on the spindle and fixed to the brake drum is a chuck housing 64 from which a plurality of radial chuck screws 65 project. The radial movement of these screws is controlled by bevel pinions 66 threaded thereon inside the housing and engaged by a bevel gear 67 forming the outer face of the housing and turnable relative thereto. A hand wheel 68 is secured to and projects outwardly from this gear concentric therewith so that the chuck screws may be conveniently manipulated.

Figure 8:
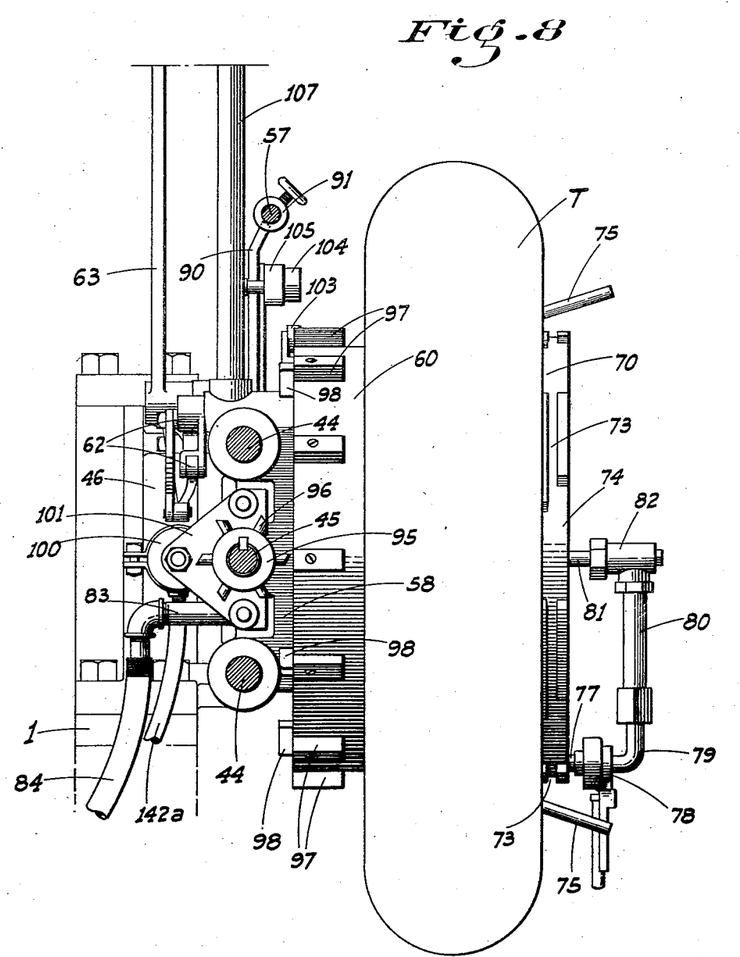
Fig. 8 is a similar view on the line 8—8 of Fig. 6.
Figure 9:
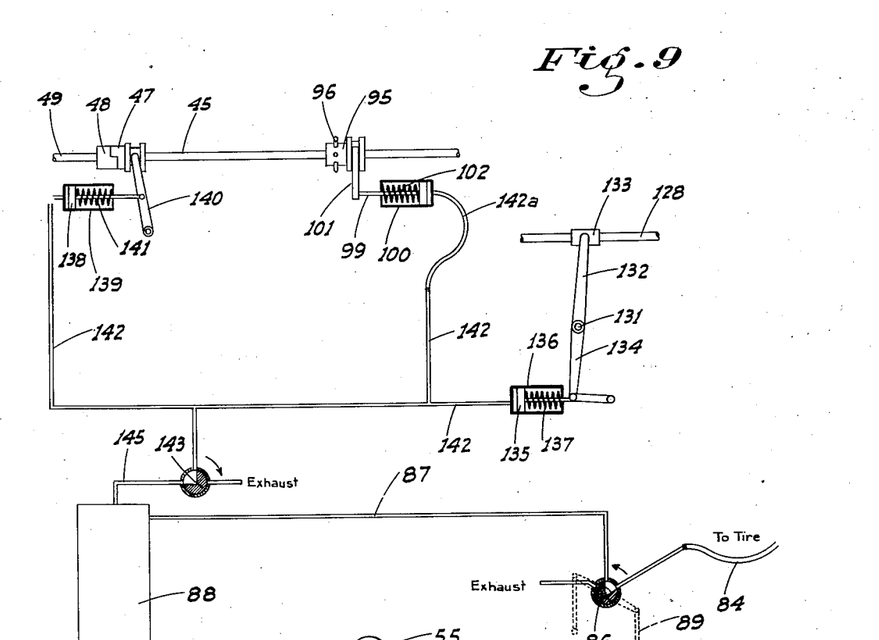
Fig. 9 is a diagram of the compressed air actuated control device of the machine.

The chuck screws engage either one or the other (depending on the size of the tire) of a pair of internal circumferential locating grooves 69 formed in a special rim 70 on which the tire T is mounted, so as to hold the latter concentric with the chuck housing and spindle 59. The locking ring 71 for the rim removably fits on said rim and has inwardly projecting and circumferentially spaced lugs 72. These lugs are adapted to engage in either one of a pair of transversely spaced circumferential and segmental grooves 73 cut in the rim toward its outer edge. The side walls of these grooves are cut away to the outer edge of the rim at intervals for a length greater than that of the lugs 72, as shown at 74 in Figs. 2 and 8. In this manner the ring may be slipped onto the rim when the lugs are positioned to register with the cut away portions, and then turned so that the lugs enter the groove and prevent outward movement of the ring. The locking ring has opposed handle rods 75 whereby it may be easily pushed into place and then turned.

The positioning of the ring 71 relative to the outer or inner one of the grooves 73 depends of course on the cross sectional size of the tire being mounted on the rim. Similarly the engagement of the chuck screws with the outer or inner rim groove 73 depends on the cross sectional size of the tire, in order to bring the central transverse plane of the tire, regardless of its size, as close to a symmetrical relationship to the gauge plates 30 as possible.

A pressure bag 76 is inserted in the tire before the latter is placed on the rim, this bag having an air connecting stem 77 projecting from the inner circumference thereof. The stem after leaving the bag makes a sharp right angle turn so as to extend parallel to the axis of the tire and its length is sufficient for it to project beyond the outer edge of the rim. At its outer end the stem has detachable air-tight connection with the adjacent end of a cooperating fitting 78 which is swivelly mounted on an air passage member 79. This member is turnable and slidable in another passage 80 which extends radially of the tire from a passage 81 which is secured to the outer end and which extends axially of the spindle 59; the fitting 82 connecting the members 80 and 81 being turnable on the latter. In this manner the air connection between the tire bag and the spindle 59 may be easily made regardless of variations in the diameter of the tire and rim, and the resultant change of distance of the stem 77 from the spindle, and regardless of the circumferential position of the stem about the chuck housing.

In operation a rim of the right size for the particular tire to be worked on is placed on the chuck before the tire is mounted, the chuck casing being held against rotation while this is being done and until the locking ring is secured in place by applying the brake 61. The brake is then released permitting the tire to be freely rotated. The length of the brake control handle 63 is such that its upper end projects above the top of the tire so that it can be manipulated from in front of the same.

A nipple 83 is secured to the cross head 58 with a length of flexible air hose 84 connected thereto, the nipple communicating with the tubular spindle by a suitable passage 85 in the cross head. This hose is connected to one port of a three-way valve 86 from another port of which a conduit 87 leads to a compressed air tank 88 or other source of pressure; the other port of the valve communicating with the atmosphere. A pedal device 89 (see Fig. 2) controls the movement of the valve to an air feeding or exhausting position; the pressure in the tank being automatically maintained at whatever degree is necessary by suitable means.

A rigid finger 90 projects upwardly from the cross head to adjacent the rod 57 so as to engage either one or the other of a pair of stop collars 91 and 92 adjustably mounted on said rod. The collar 91 is positioned so that the rod will be shifted back to throw the switch arm 53 to a neutral position after the tire has been retracted from the rolls a predetermined distance with the operation of the motor in a corresponding direction. The stop collar 92 is positioned so that the motor is shut off from rotation in the opposite direction, by throwing the switch arm to a neutral position with a corresponding movement of the rod 57, when the tire has reached a predetermined position relative to the front roll of the mill.

Figure 11:
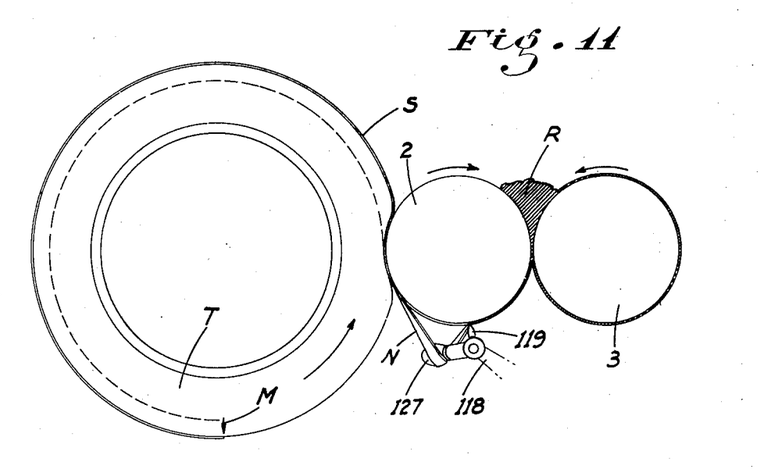
Fig. 11 is a diagram showing the application of the rubber about the tire.

This position is such that the tire is flattened in cross section somewhat where it engages the roll, as shown in Fig. 11. The extent of this flattening is accurately determined for tires of different sizes and according to what experience has shown to be correct by means of a finger 93 associated with the collar 92 for reading against a chart fastened on a fixed vertical board 94, the chart being figured to take care of the size range of all tires.

Slidably keyed on the shaft 45 is a collar 95 having a plurality of pins 96 projecting radially therefrom. Spaced circumferentially about the brake drum 60 are holders 97 to removably support lugs 98 which extend radially from the back of the drum in the direction of the axis thereof. The pins 96 are normally clear of the path of movement of the lugs with relation to the rotation of the tire and its supporting structure. Said pins however are adapted to be moved into such path by the piston rod 99 of an air cylinder 100 secured to the cross head, the rod being connected to a yoke 101 which engages the collar 95. A spring 102 in the cylinder acts to hold the piston and collar in a retracted position relative to the lugs, the piston being advanced when air under pressure is admitted into the cylinder and the resistance of the spring is overcome.

One of the lugs has a roller 103 disposed so as to engage another roller 104 projected from a horizontal arm 105 pivoted in connection with the cross head on top. The roller 103 is adapted with the rotation of the drum to pass under and engage the roller 104 so as to lift the arm 105; such movement of the arm effecting the actuation of a control 106 of suitable character mounted on a post 107 supported from the cross head and positioned so as to be readily viewed from in front of the tire, as shown in Fig. 2.

Extending under the rolls of the mill parallel to the shaft 45 and supported from the adjacent frame 1 is a shaft 108. A clutch element 109 is splined on the shaft, which element is adapted to engage a cooperating element 110 fixed in connection with a sprocket wheel 111 by which driving engagement with a similar sprocket 112 fixed on the adjacent end of the shaft 45 is had by means of a chain 113. At its opposite end the shaft 108 is geared to a shaft 114 extending parallel to the rolls and disposed back of the front roll. Said shaft intermediate its ends but near the left hand end is formed with lengths of right and left hand threads as shown at 115. The opposite end of the shaft has gear connection with a hand shaft 116 extending to the front of the mill and provided with a hand wheel 117.

Figure 3:
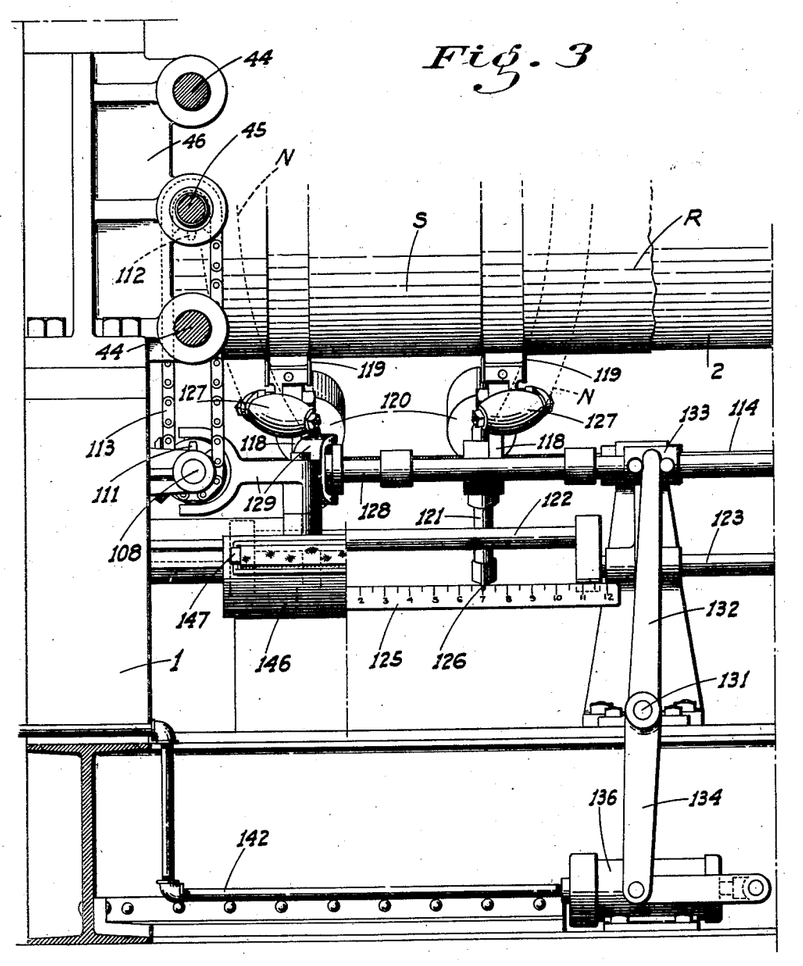
Fig. 3 is an enlarged fragmentary front view of the mill showing the strip width gauging and cutting mechanism.
Figure 4:
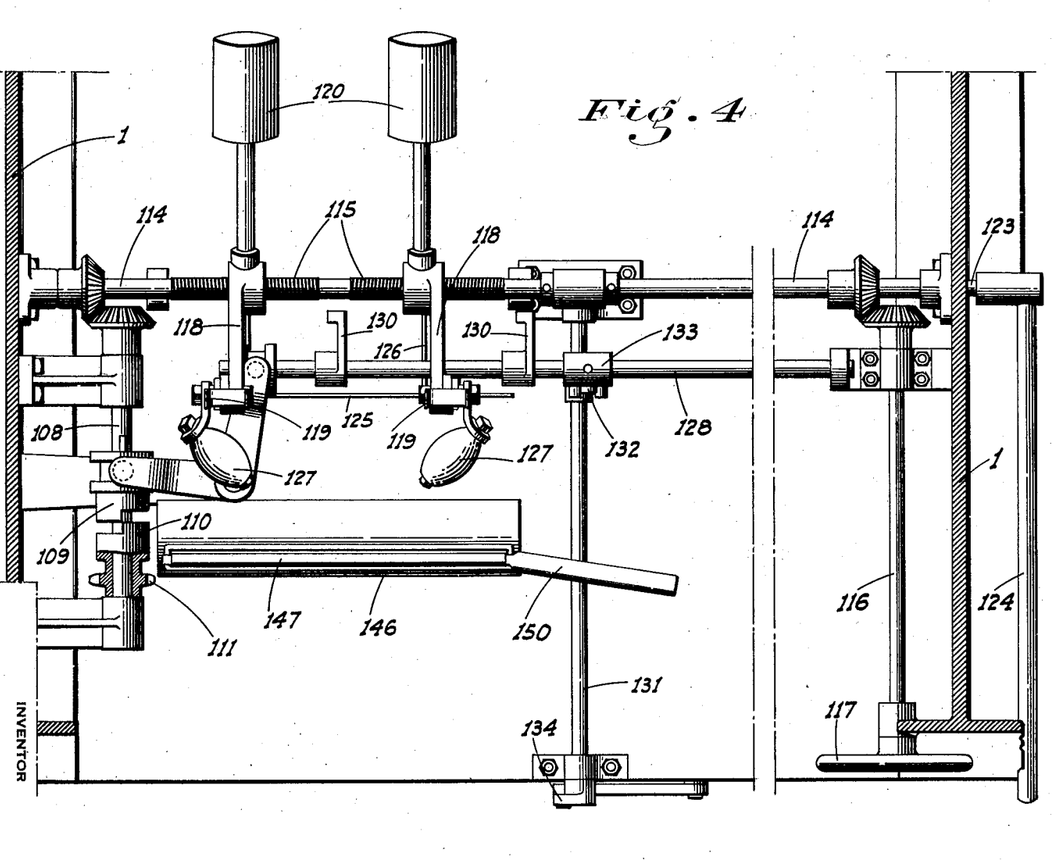
Fig. 4 is a top plan view of the same with the rolls removed.

Mounted intermediate its ends on the threaded portions of the shaft 114 are arms 118 extending forwardly under the front roll. Each arm at its front end carries a pair of upwardly projecting cutter elements 119 spaced lengthwise of the roll and adapted to engage the under face of the same adjacent its bottom central plane. When these elements are engaged with the roll they cut two narrow strips N of rubber from the bulk of rubber R disposed about the roll and leave a central wide strip S of the width desired for application to the tire. Counterweights 120 are connected to the arms 118 and project rearwardly from the shaft 114 and act to hold the cutters in contact with the roll. The action of the counterweights is offset by stems 121 depending from the arms and bearing against the back side of the crank rod 122 of a shaft 123 which extends under the shaft 114 parallel thereto; the rod 122 being above its shaft.

The shaft 122 extends to the right hand frame 1 where it is connected with a forwardly projecting operating lever 124. By means of this lever, when it is not desired to have the cutters contact with the roll (as when the cushion rubber is being used), the rod 122 may be thrown back against the stems 121, causing the arms 118 to be turned to lower and hold the cutters from contact with the roll. Cooperating scale and pointer elements 125 and 126 respectively are connected to the lower ends of the stems in front of the crank rod so that the cutters may be initially set to the desired accurate spacing by manipulation of the hand wheel 117.

Supported from the upper ends of the arms 118 in front of the same and of the cutters and in forwardly and downwardly angled relation to the latter are rollers 127, of convex longitudinal curvature. These rollers are adapted to engage with the strips N so as to enable such strips to be deflected from their original positions on the roll and from the central strip S as the latter moves up from underneath for engagement with the tire. These strips N after being initially formed for a certain length by the rotation of the rolls are caught and pulled out by the operator and engaged with the rollers. The portions of said strips above the rollers are severed from the mass of rubber and are re-engaged with the main portion of the rubber to the sides of the main strip. With the further rotation of the rolls therefore said narrow strips as they are formed by the cutters will be continuously engaged by the rollers and will be maintained deflected, so as to be clear of the plane of contact of the tire with the roll, and thus insuring that no rubber to the sides of the main strip S can be engaged with the tire; since the roll is uncovered and clean for a certain distance on each side of the main strip.

Disposed parallel to and in front of the shaft 114 is another shaft 128 which is connected at one end to one arm of a bell crank 129, the other arm of which is connected to the clutch element 109. Upon moving said shaft in one direction therefore the clutch elements 109 and 110 will be engaged in driving relation with the sprocket wheel 111; the shafts 108 and 114 will be driven and the cutters will be moved along the shaft. The direction of cut of the threads 115 is such that with the rotation of the shaft 45 in a tire retracting direction, the cutter arms 118 and the cutters will be moved toward each other. Stop arms 130 project rearwardly from the shaft 128 in the path of movement of the shaft engaging hubs of the arms 118, so as to be engaged by the same as the arms move to either end of the threads, and by thus imparting a clutch releasing movement to the shaft 128 will prevent the arm hubs from being possibly driven off the threads.

The shaft 128 is normally positioned so that the clutch is released and is moved in the opposite direction to cause the clutch to be engaged by power means controlled at the will of the operator, and arranged as follows.

Projecting under the shaft 128 from the front of the mill is a control shaft 131 having an upstanding shift arm 132 engaging a collar 133 fixed on the shaft 128. An arm 134 depends from the forward end of the shaft 131 and is linked to the piston 135 of a fixed air cylinder 136. A spring 137 in the cylinder acts to hold the piston retracted and the shaft 128 in a clutch releasing position.

The piston 138 of another air cylinder 139 is connected to the throw out arm 140 of the clutch element 47, a spring 141 holding the piston retracted and the clutch elements normally engaged. All three air cylinders—100, 136 and 139—are connected by conduits 142 with one port of a three-way valve 143, which is controlled by a suitably positioned handle 144 (see Fig. 2). The conduit to the cylinder 100 (which moves with the tire) includes a length of flexible hose 142a. Another port of the valve 143 is connected by a conduit 145 to the tank 88 while its third port exhausts to the atmosphere. Upon proper manipulation of the valve handle therefore air may be fed to all three cylinders simultaneously causing the driving connection between the motor 51 and the shaft 45 to be broken, the pins 96 to be moved into the path of the lugs 98, and the driving connection between the shafts 45 and 114 to be established.

Mounted on the base of the mill between the frames 1 and at the front of and below the front roll 2 is a cylindrical casing 146. This casing is positioned in alinement with the strip between the cutters and its length is greater than any spacing to which the cutters may be adjusted. A thin rubber deflecting blade 147 is disposed lengthwise of and above the casing, being connected to the adjacent end of a length of flexible material 148. This material projects through a longitudinal slot in the front side of the casing and is rolled about a spring actuated core 149 in the casing and of substantially the same construction as employed in the ordinary shade roller, or so that the material will be normally wound about the core and the blade held adjacent the casing. A handle 150 projects from the right hand end of the blade so that it may be easily pulled up against the resistance of the spring core.

Since at certain times it is desirable to employ the same, I provide a roller 151 for applying a breaker strip to the tire, said roller being mounted in alinement with the tire adjacent the back standard 46 and being driven by an individual motor 152.

The tire to which the tread is to be applied is first subjected to the action of a buffing machine to remove the old tread rubber, and expose the fabric, so that a roughened surface to which the new rubber readily adheres without the need of cement, is provided.

In operation a mass of cushion rubber 43 sufficient for one wrapping about the tire is first placed in the mill so as to be rolled in a plane between the gauge plates 36. At the same time if desired a mass of tread rubber R may be placed in the mill to the side of the side of the cushion rubber so as to be rolled without mixing with the cushion stock. The tire to be worked on, which has been already heated in a suitable enclosure, is then mounted on the rim as previously described and the bag 76 is filled with air under pressure and maintained at such pressure until the completion of the rubber wrapping operations. The rolls are set to the desired spacing by operation of the motor 23 and the hand wheel 21, and the stop 92 is set so that the advance of the tire will be halted when it has engaged the front roll 2 and has been flattened a predetermined extent as determined by the chart on the board 94 and according to the size of the particular tire.

The switch of the motor 51 is then closed by manually pulling the rod 57 in the direction away from the mill, when the accompanying operation of the motor and the rotation of the screw shaft 45 advances the tire and its supporting structure as a unit. When the finger 90 on the cross head 58 engages the stop 92 and pulls the rod 57 to a switch opening position, it stops the motor and the advance of the tire. The tire is then compressed and flattened where it engages the roll for a width at least equal to that of the strip to be applied. Such engagement also causes the tire to be rotated by reason of its contact with the roll and the rubber strip to be transferred from the roll onto the tire, the strip being severed on the roll at this point.

Figures 12, 13:
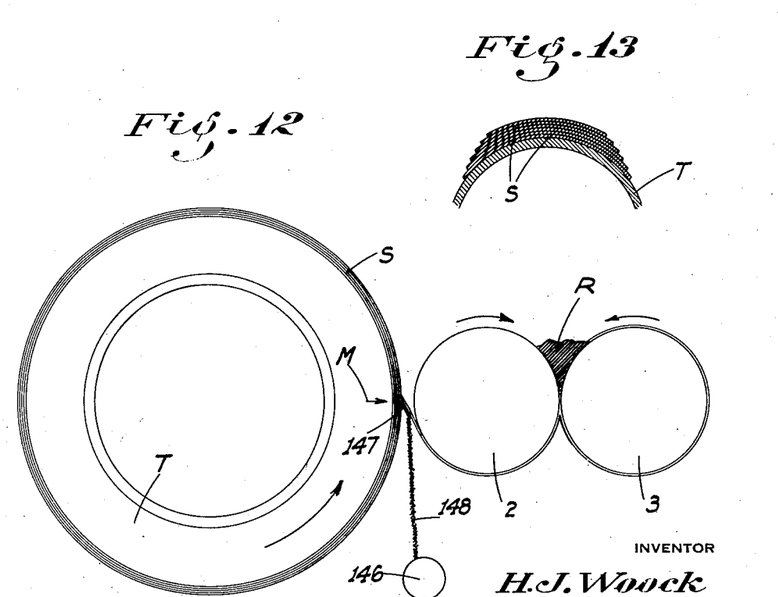
Fig. 12 is a similar view showing the step of stopping the wrapping of the rubber about the tire.
Fig. 13 is a fragmentary cross section of a tire with the wrappings of tread rubber thereon.

In the meantime the gauge plates 36 have been set to the desired spacing and depressed into contact with the rolls by admitting air to the cylinder 30. The strip as applied to the tire will thus be of an even and desired width. At the initial point of contact of the tire with the roll, a chalk or other mark M as indicated in Figs. 11 and 12 is made on the side of the tire, this mark serving as a gauge for the wrapping of the rubber thereabout. As the wrapping of the rubber one complete turn about the tire approaches the starting point the operator raises the blade 147 and places the same against the face of the tire in alinement with the mark M, and so that it is between the tire and the rubber being stripped from the roll. As the rubber from the roll reaches the starting point on the tire the operator throws the rod 57 so that the motor is started in the reverse direction, causing the tire to back away from the roll and giving room for the blade to be manipulated to sever the rubber between the tire and roll so that no more than necessary will be engaged with the tire.

The blade is then allowed to drop to its normal resting place adjacent the casing 146 by the pull of the length of the material 148 thereon. It is to be understood that an exact termination of the wrapping is not absolutely necessary, nor is a neat finish, since this wrapping is later covered with the tread rubber and is never seen and in any event the finish is produced by the matrix in the retreading mold in which the tire is subsequently placed.

During the above operations the various air actuated devices are not in use. In other words, the clutch elements 47 and 48 remain engaged; the pins 96 are held from the path of the lugs 98; and the clutch elements 109 and 110 remain disengaged. Also the lever 124 is thrown so that the cutters 119 are lowered from the roll, since these cutters have nothing to do with the placing of the cushion strip on the tire.

With the reverse operation of the motor, as above described, the tire continues to back away from the roll until the finger 90 engages the stop 91 and pushes the rod 57 so that the operation of the motor is halted. Air is then exhausted from the cylinder 30 so that the gauge plates 36 are lifted clear of the rolls and the remaining cushion rubber is stripped from the rolls while the tread rubber is allowed to take its place, the rolls rotating continuously. The counter 106 which registers in decreasing order is also now set according to the number of wraps of tread rubber desired. The cutters 119 are then spaced by hand to give the strip S the desired width between the cutters.

The lever 124 is manipulated to move the cutters into engagement with the roll and with the rotation of the latter, the narrow strips N as formed from the mass of rubber passing about the roll between the pairs of cutters are caught and deflected over the rollers 127 as previously described. This leaves the wide strip of rubber S with clean cut edges and with uncovered clean portions of the roll to the sides of the strip so that there is no chance of any rubber other than that of the strip itself engaging and adhering to the tire.

These operations being completed—and which only consume a very short time—the motor 51 is started by manual operation of the rod 57 in a tire advancing direction until such advancing movement is halted as before by the engagement of the finger 90 with the stop 92, whereupon the tire as before rotates by contact with the roll 2. The wrapping of the tread rubber strip about the tire in superimposed relation to the cushion wrapping thereon immediately begins, the original mark M or a new one being used to denote the starting point of such wrappings.

At the same time, the pressure in the tire is reduced somewhat, so as to prevent the still soft cushion strip from being subjected to such pressure as would cause it to be possibly squeezed out of place laterally.

Simultaneously with the starting of the wrapping operation the operator manipulates the valve control handle 144 so as to admit air to the cylinders 139, 100, and 136. This causes the connection between the motor 51 and the shaft 45 to be broken, the pins 96 to be moved into the path of movement of the lugs 98, and the clutch elements 109 and 110 to be engaged. The shaft 114 will thus be rotated as the shaft 45 rotates, which as before stated will cause the cutters to be moved along said shaft 114 in one direction or the other. Such rotation is intermittently imparted to the shaft 45 a certain number of times with each full revolution of the tire according to the number of lugs 98 on the brake drum 60, as said lugs engage and push past the pins 96 successively and thus rotate the collar 95 and the shaft 45 to which said collar is keyed.

The direction of rotation of the shaft 45 thus had relative to the direction of cut of the screw threads 115 on the shaft 114 is such that the cutters 119 are moved closer together.

As a result the strip S is gradually lessened in width as the wraps about the tire increase so that as the wraps are completed the cross sectional form of the rubber thus applied approximates that of the finished tread, as shown in Fig. 13. The extent to which the widening of the strips is thus lessened and consequently the degree of side slope of the built up rubber on the tire, depends of course on the number of lugs 98 used, since obviously the more lugs there are the more times will turning movements be imparted to the collar 95 with each full revolution of the tire. Also, with such rotation of the shaft 45 the tire is intermittently backed up slightly from the roll or sufficient to counteract for the thickness of the rubber being added and to only maintain the tire flattened for a width equal to that of the rubber strip being applied at that time.

At the same time with each revolution of the tire the counter 106 is actuated by the roller 103, so that the operator will know how many wraps have been applied to the tire or are still to be applied without having to continually watch the tire itself. When the final wrap is about completed the operator again deflects and severs the rubber passing from the roll onto the tire by the use of the blade 147 as before. At about the same time the air is exhausted from the various cylinders so that the driving engagement between the motor 51 and shaft 45 is reestablished. This enables the tire to be retracted upon the motor switch being again closed by hand as was done after the cushion-strip wrapping operation.

After the full retraction of the tire and the resultant halting of the motor, the operator sets the brake 61 and exhausts the air from the tire bag by manipulating the pedal 89. He then uncouples the air connection with the bag and the tire and bag are removed as a unit from the rim after withdrawing the locking ring 71. The tire may be then immediately placed in a mold and vulcanized to provide the finished and cured retread.

I have found that by the use of my improved apparatus as herein disclosed, I am enabled to cause the tread rubber to effectively adhere to the tire without the use of applying an independent coating of rubber cement between the rubber and the tire. This eliminates the cost of cement and the cost of labor for applying the same, thus materially reducing the ultimate cost of the tread applying operations.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A machine for applying tread rubber to a tire comprising a roll about which the rubber is disposed in sheet-like form, means associated with the roll to cut the rubber to a strip of a certain width during the operation of the roll, a rotatable tire supporting device, means to support the device so that the tire may contact with the strip on the roll and be rotated by such contact whereby the strip will be transferred from the roll to the tire and be wrapped about the latter, said means including a rotatable shaft, means to rotate said shaft by the rotation of the tire, means controllable at will to place said shaft rotating means in operation, and connecting means between said shaft and the strip forming means to cause the width of the strip to be lessened by such rotation of the shaft.

2. In a machine for applying rubber to a tire in the form of a continuous strip, a driven roll on which the rubber is initially disposed, laterally movable cutters engaging the roll to form a strip of predetermined width, a rotatable tire supporting device, means to advance the device toward the roll so that the tire will contact with the strip on the roll and be rotated by such contact whereby the strip will be applied to the tire, said advancing means comprising a longitudinally immovable screw shaft threaded through the device, a power plant for rotating the shaft and normally engaged releasable connections between the power plant and shaft, means actuable by the rotation of the tire for rotating the shaft, connecting means between the shaft and cutters to move the latter laterally with such rotation of the shaft, means to place the shaft rotating means in operation, means to disengage said releasable connections, and means controllable at will for operating said two last named means simultaneously.

3. In a machine for applying rubber to a tire in the form of a continuous strip, a driven roll on which the rubber is initially disposed, laterally movable cutters engaging the roll to form a strip of predetermined width, a rotatable tire supporting device, means to advance the device toward the roll so that the tire will contact with the strip on the roll and be rotated by such contact whereby the strip will be applied to the tire, said advancing means comprising a longitudinally immovable screw shaft threaded through the device, a power plant for rotating the shaft, means actuable by the rotation of the tire for rotating the shaft, a connecting mechanism between the shaft and cutters to move the latter laterally with such rotation of the shaft, said mechanism including normally disengaged connections, means to place the shaft rotating means in operation, means to move said connections into engagement, and means controllable at will for operating said two last named means simultaneously.

4. In a machine for applying rubber to a tire in the form of a continuous strip, a mill-roll on which the rubber is initially disposed, laterally movable cutters engaging the roll to form a strip of predetermined width, means to hold a tire in pressing engagement with the strip on the roll whereby the tire will be rotated, a shaft parallel to the roll having oppositely cut threaded portions thereon, cutter supports on said threaded portions, another shaft associated with the tire holding means, means to rotate said other shaft with the rotation of the tire, normally disengaged driving connections between said shafts, and means operable at will to place such connections in engagement.

5. A structure as in claim 4, with hand means applied to said threaded shaft to rotate the same.

6. In a machine for applying rubber to a tire in the form of a continuous strip, a driven roll on which the rubber is initially disposed, cutters engaging the roll to form a strip of predetermined width, means to hold a tire in pressing engagement with the strip on the roll whereby the tire will be rotated, a shaft parallel to the roll, cutter supports on said shaft, yieldable means normally holding the cutters against the roll, stems projecting radially of the shaft from the cutter supports, a crank shaft parallel to said threaded shaft against one side of the crank portion of which the stems movably bear, and means to turn the crankshaft at will.

7. In a machine for applying rubber to a tire in the form of a continuous strip, a driven roll on which the rubber is initially disposed, laterally movable cutters engaging the roll to form a strip of predetermined width, means to hold a tire in pressing engagement with the strip on the roll whereby the tire will be rotated, a shaft parallel to the roll having oppositely cut threaded portions, cutter supports on said threaded portions, means to rotate said shaft whereby the supports and cutters will be moved along the roll, yieldable means normally holding the cutters against the roll, and means operable at will to turn the supports on the shaft in a direction to withdraw the cutters from the roll simultaneously.

8. In a machine for applying rubber to a tire in the form of a continuous strip, a driven roll on which the rubber is initially disposed, laterally movable cutters engaging the roll to form a strip of predetermined width, a rotatable tire supporting device, means to support the device so that the tire will contact with the strip on the roll and be rotated by such contact whereby the strip will be applied to the tire, said supporting means including a rotatable shaft, connecting means between the shaft and cutters to move the latter with the rotation of the shaft, a collar slidably keyed on the shaft, pins projecting from the collar, lugs mounted on the rotatable device radially thereof and means for moving the collar along the shaft at will to a position such that the pins project into the path of movement of the lugs as the supporting device rotates.

9. In a machine for applying rubber to a tire in the form of a continuous strip, a driven roll on which the rubber is initially disposed, laterally movable cutters engaging the roll to form a strip of predetermined width, a rotatable tire supporting device, means to support the device so that the tire will contact with the strip on the roll and be rotated by such contact whereby the strip will be applied to the tire, said supporting means including a rotatable shaft, connecting means between the shaft and cutters to move the latter with the rotation of the shaft, a collar slidably keyed on the shaft, pins projecting from the collar, lugs mounted on the rotatable device radially thereof, and means operable from a point remote from the supporting device for moving the collar along the shaft so that the pins project into the path of movement of the lugs.

10. In a machine for applying rubber to a tire in the form of a continuous strip, a driven roll on which the rubber is initially disposed, laterally movable cutters engaging the roll to form a strip of predetermined width, a rotatable tire supporting device, means to support the device so that the tire will contact with the strip on the roll and be rotated by such contact whereby the strip will be applied to the tire, said supporting means including a rotatable shaft, connecting means between the shaft and cutters to move the latter with the rotation of the shaft, a collar slidably keyed on the shaft, pins projecting from the collar, lugs mounted on the rotatable device radially thereof, a pneumatic unit mounted on the tire supporting device and applied to the collar to move the same along the shaft so that the pins project into the path of movement of the lugs, and a flexible feed conduit connected to said unit and leading from a source of supply remote from the unit.

11. In a machine for applying tread rubber to a tire in the form of a continuous strip, movable strip cutters mounted for lateral movement, means whereby the tire will be rotated as the strip is applied to the tire, means controlled by such rotation for moving the cutters intermittently and toward each other, and means included with said last named means to enable the number of such intermittent movements for each complete revolution of the tire to be altered.

12. In a machine for applying rubber to a tire in the form of a continuous strip, a driven roll on which the rubber is initially disposed, laterally movable cutters engaging the roll to form a strip of predetermined width, a rotatable tire supporting device, means to support the device so that the tire will contact with the strip on the roll and be rotated by such contact whereby the strip will be applied to the tire, said supporting means including a rotatable shaft, connecting means between the shaft and cutters to move the latter with the rotation of the shaft, a collar slidably keyed on the shaft, elements projecting from the collar, a drum mounted axially of the tire supporting device to one side of the shaft and collar and turnable with the tire, a plurality of circumferentially spaced holders on the drum, and lugs to engage the elements with the rotation of the drum removably mounted in the holders.

13. In a machine for applying rubber to a tire in the form of a continuous strip, a driven roll on which the rubber is initially disposed, laterally movable cutters engaging the roll to form a strip of predetermined width, a rotatable tire supporting device, means to advance the device toward the roll so that the tire will contact with the strip on the roll and be rotated by such contact whereby the strip will be applied to the tire, said advancing means comprising a longitudinally immovable screw shaft threaded through the device, connecting means between the shaft and cutters to move the latter with the rotation of the shaft, and means to thus rotate the shaft; the direction of rotation of the shaft relative to the cut of the threads being such that said rotation imparts a retractive movement to the tire supporting device.

14. In a machine for applying rubber to a tire in the form of a continuous strip, a driven roll about which the rubber is initially disposed, a device to rotatably support a tire, means to advance the tire into pressing engagement with the strip on the roll whereby the tire will be rotated and the strip transferred from the roll onto the tire and wrapped thereabout and means functioning to retract the tire from the roll as the successive wrappings of the rubber are disposed about the tire with the rotation thereof.

15. In a machine for applying rubber to a tire in the form of a continuous strip, a driven roll about which the rubber is initially disposed, a device to rotatably support a tire, means to maintain a predetermined pressure within the supported tire, and means to advance the tire into contact with the roll until its periphery at the point of contact is transversely flattened to an extent corresponding in width to that of the strip to be applied.

16. A structure as in claim 15, with means to alter the width of the strip as the same is wrapped about the tire and to also simultaneously retract the tire from the roll to an extent sufficient to maintain the width of the flattened portion substantially equal to that of the strip.

17. In a machine for applying rubber to a tire in the form of a continuous strip, a driven roll about which the rubber is initially disposed, a device to rotatably support a tire, means to advance the tire into pressing engagement with the roll to cause the strip to be transferred to the tire, and means functioning with the advance of the tire to a predetermined position relative to the roll for halting the advancing movement.

18. A structure as in claim 17, with adjustable means included with said first named means whereby the advancing means may be selectively halted when the tire supporting device is varying distances from the roll.

19. A structure as in claim 17 in which said means included a manually operable member whereby the advancing movement may be controlled irrespective of the position of the tire relative to the roll.

20. In a machine for applying rubber to a tire in the form of a continuous strip, a driven roll about which the rubber is initially disposed, a device to rotatably support a tire, means supporting said device for movement at right angles to the axis of the roll, an electric motor for advancing the device toward the roll, a switch for the circuit of the motor, a rod connected to the throw arm of the switch extending parallel to and along the device supporting means, an adjustable stop on the rod, and a finger mounted on the device to engage the stop and move the rod lengthwise to open the switch when the tire has been advanced to a predetermined position relative to the roll.

21. In a machine for applying rubber to a tire in the form of a continuous strip, a driven roll about which the rubber is initially disposed, support and guide elements extending at right angles to the roll, a tire supporting device slidable along the elements, a screw shaft threaded through the device, and a reversible power device operatively connected to the shaft.

22. In a machine for applying rubber to a tire in the form of a continuous strip, a driven roll about which the rubber is initially disposed, support and guide elements extending at right angles to the roll, a tire supporting device slidable along the elements, a screw shaft threaded through the device, a reversible electric motor connected to the shaft, a switch in the motor circuit having a throw arm movable in opposite directions from an open position to control the operation of the motor in opposite directions, and switch control means operated by the movement of the device in opposite directions to predetermined positions along the supporting elements to move the switch arm to an open position.

23. In a machine for applying rubber to a tire in the form of a continuous strip, a driven roll about which the rubber is initially disposed, support and guide elements extending at right angles to the roll, a cross head slidably supported on the elements, means to move the cross head along the elements, and a tire-rim holding device turnably mounted on the cross head and disposed with its axis of rotation parallel to the roll.

24. In a machine for applying rubber to a tire in the form of a continuous strip, a driven roll about which the rubber is initially disposed, support and guide elements extending at right angles to the roll, a cross head slidably supported on the elements, means to move the cross head along the elements, a tire-rim engaging chuck turnably mounted on the cross head and disposed with its axis of rotation parallel to the roll, and means controlled at will to hold the chuck against rotation.

25. In a machine for applying rubber to a tire in the form of a continuous strip, a driven roll about which the rubber is initially disposed, support and guide elements extending at right angles to the roll, a cross head slidably supported on the elements, means to move the cross head along the elements, a spindle rigid with and projecting from the cross head paralled to the roll, a tire-rim engaging chuck turnable on the spindle, a brake drum fixed with the chuck, a brake band anchored on the cross head, and a brake lever for actuating the band mounted on the cross head.

26. In a machine for applying rubber to a tire in the form of a continuous strip, a driven roll about which the rubber is initially disposed, support and guide elements extending at right angles to the roll, a cross head slidably supported on the elements, means to move the cross head along the elements, a tire supporting rim, and means removably and turnably supporting the rim from the cross head so that the axis of the tire is parallel to the roll.

27. In a machine for applying rubber to a tire in the form of a continuous strip, a driven roll about which the rubber is initially disposed, a cross head, means to move the cross head at right angles to the roll, a tire supporting rim, means removably and turnably supporting the rim from the cross head so that the axis of the tire is parallel to the roll, and means to maintain a tire on the rim under pressure while supported from the cross head.

28. In a machine for applying rubber to a tire in the form of a continuous strip, a driven roll about which the rubber is initially disposed, a cross head, means to move the cross head at right angles to the roll, a tubular spindle rigid with and projecting from one side of the cross head parallel to the roll, means turnably mounted on the spindle to support a tire engaging rim, an air passage conduit projecting radially of the spindle from the outer end of the spindle and turnable relative thereto, said conduit at its outer end being adapted for connection to the air stem of a tire tube, and a flexible conduit connected to the cross head and communicating with the adjacent end of the spindle.

29. In a machine for applying rubber to a tire in the form of a continuous strip, a driven roll about which the rubber is initially disposed, a chuck, means mounting the chuck with its axis of rotation parallel to the roll, said chuck including a casing and adjustable chuck pins projecting radially from the casing, and a tire engaging rim to extend over the casing and having transversely spaced grooves in its inner periphery for separate engagement with the outer ends of the pins.

30. In a machine for applying rubber to a tire in the form of a continuous strip, a driven roll about which the rubber is initially disposed, a device to rotatably support a tire, means to relatively advance the tire into pressing engagement with the strip on the roll whereby the tire will be rotated, and means to maintain a constant and predetermined pressure within the tire while it is thus supported and being rotated.

31. A machine for applying tread rubber to a tire comprising a mill to roll the rubber to a thin sheet-like form, cutters engaging one of the rolls of the mill to cut the rubber sheet intermediate its edges to form a strip for application to a tire, means to hold a tire in rotatable engagement with said roll in the plane of the strip, means cooperating with the cutters to cut other relatively narrow strips in the rubber to the sides of the first named strip coincident with the cutting of the latter; there being means for engagement with said narrow strips to hold them deflected laterally of the first named strip and clear of the roll in the plane of engagement of the tire therewith.

32. A machine for applying tread rubber to a tire comprising a mill to roll the rubber to a thin sheet-like form, laterally spaced cutting units each comprising a pair of laterally and relatively close-spaced cutters engaging one of the rolls to form a central relatively wide rubber strip and narrower side strips, means supporting the cutting units, and rollers supported by said means and disposed in front of the cutters relative to the direction of rotation of the roll in forwardly angled relation to the axis of the roll and of a length greater than the width of the narrow strips.

33. In a machine for applying tread rubber to a tire, a mill comprising a pair of horizontally spaced rolls, laterally spaced gauge plates positioned above and centrally between the rolls, the opposed edges of said plates being curved to fit the peripheries of the rolls, means supporting said plates for vertical movement, and means to control such movement.

34. In a machine for applying tread rubber to a tire, a mill comprising a pair of horizontally spaced rolls, laterally spaced gauge plates positioned above and centrally between the rolls, the opposed edges of said plates being curved to fit the peripheries of the rolls, a bar parallel to the rolls from which the plates depend, means slidably supporting said bar for vertical movement, means applied to the bar to normally hold the same raised so that the plates are clear of the rolls, and means to lower the bar against the resistance of said holding means at will.

35. In a machine for applying tread rubber to a tire, a mill including a roll about which the rubber to be applied to the tire is disposed, means to rotatably support a tire in engagement with the roll in the plane of the rubber thereon whereby the tire will be rotated with the roll and the rubber wound thereabout in the form of a continuous strip, and means operable at will and mounted in association with the roll for engagement between the strip passing from the roll onto the tire to prevent further wrapping of the strip about the tire.

36. In a machine for applying tread rubber to a tire, a mill including a roll about which the rubber to be applied to the tire is disposed, means to rotatably support a tire in engagement with the roll in the plane of the rubber thereon whereby the tire will be rotated with the roll and the rubber wound thereabout in the form of a continuous strip, and a separating and severing device mounted in connection with the roll for placement between the tire and the strip passing from the roll to prevent further adhesion of the strip to the tire and enable the strip to be severed from the tire.

37. In a machine for applying tread rubber to a tire, a mill including a roll about which the rubber to be applied to the tire is disposed, means to rotatably support a tire in engagement with the roll in the plane of the rubber thereon whereby the tire will be rotated with the roll and the rubber wound thereabout in the form of a continuous strip, a blade adapted for engagement with the tire transversely thereof, a length of flexible material depending from the blade, and means mounting the lower end of the material in connection with the roll in the plane of the strip.

38. In a machine for applying rubber to a tire in the form of a continuous strip, a driven roll on which the rubber is initially disposed, cutters to engage the rubber on the roll to form a strip of predetermined width, means to hold a tire in contact with the strip on the roll whereby the tire will be rotated, a shaft parallel to said roll, cutter supports mounted on the shaft, yieldable means normally holding the cutters against the roll, and means operable at will to turn the supports on the shaft in a direction to withdraw the cutters from contact with the roll and rubber.

39. In a machine for applying tread rubber to a tire in the form of a continuous strip, movable strip cutters mounted for lateral movement, means whereby the tire will be rotated as the strip is applied to the tire, means controlled by such rotation for moving the cutters laterally, and means controlled at will from a fixed point remote from the tire for placing the cutter moving means in operation.

40. In a machine for applying rubber to a tire in the form of a continuous strip, a driven roll on which the strip is initially disposed, a rotatable tire supporting device, means to initially advance the device toward the roll so that the tire will contact with the strip on the roll and be rotated by such contact, whereby the strip will be applied to the tire, said advancing means comprising a longitudinally immovable screw shaft threaded through the device, and means to rotate the shaft in a certain direction with the rotation of the tire and device; said direction of rotation relative to the cut of the threads being such that said rotation imparts a retractive movement to the tire supporting device.

41. In a machine for applying rubber to a tire in the form of a continuous strip, a driven roll on which the rubber is initially disposed, a device to rotatably support a tire, means to advance the tire into pressing contact with the roll so that its periphery at the point of contact is transversely flattened to an extent in direct relation in width to that of the strip to be applied, and means to decrease the width of the strip as the latter is wrapped about the tire and to also simultaneously retract the tire from the roll to an extent sufficient to maintain the width of the flattened portion proportional to that of the strip.

42. In a machine for applying rubber to a tire in the form of a continuous strip, a driven roll on which the rubber is initially disposed, a tire-rim holding device disposed so that the axis of the tire is parallel to the roll, means rotatably mounting said device for movement at right angles to the roll and means applied to said device to clamp the same against rotation at will.

43. In a machine for applying rubber to a tire in the form of a continuous strip, a driven roll on which the rubber is initially disposed, laterally movable cutters normally engaging the roll to form a strip of predetermined width, and manually controlled mechanical means operable at will to move the cutters clear of the roll and including means to hold said cutters in such clear position.

44. In a machine for applying rubber to a tire in the form of a continuous strip, a driven roll on which the rubber is initially disposed, laterally movable cutters normally engaging the roll to form a strip of predetermined width, hand means to thus move the cutters, a scale parallel to the roll fixed with one cutter and projecting beyond the other cutter, and a pointer to read on the scale fixed with said other cutter.

HERBERT J. WOOCK.